United States Patent
Stainer et al.

(10) Patent No.: US 11,921,835 B2
(45) Date of Patent: Mar. 5, 2024

(54) MLU-BASED MAGNETIC DEVICE HAVING AN AUTHENTICATION AND PHYSICAL UNCLONABLE FUNCTION AND AUTHENTICATION METHOD USING SAID MLU DEVICE

(71) Applicant: Crocus Technology SA, Grenoble (FR)

(72) Inventors: Quentin Stainer, Rives sur Fure (FR); Myckael Mouchel, Grenoble (FR); Yann Conraux, Saint Laurent du Pont (FR)

(73) Assignee: CROCUS TECHNOLOGY SA, Grenoble (FR)

( * ) Notice: Subject to any disclaimer, the term of this patent is extended or adjusted under 35 U.S.C. 154(b) by 708 days.

(21) Appl. No.: 16/982,099

(22) PCT Filed: Mar. 18, 2019

(86) PCT No.: PCT/IB2019/052169
§ 371 (c)(1),
(2) Date: Sep. 18, 2020

(87) PCT Pub. No.: WO2019/180579
PCT Pub. Date: Sep. 26, 2019

(65) Prior Publication Data
US 2021/0110023 A1    Apr. 15, 2021

(30) Foreign Application Priority Data
Mar. 20, 2018   (EP) ..................................... 18315003

(51) Int. Cl.
*G06F 21/00*   (2013.01)
*H04L 29/06*   (2006.01)
(Continued)

(52) U.S. Cl.
CPC ............... *G06F 21/44* (2013.01); *G06G 7/12* (2013.01); *H04L 9/3278* (2013.01)

(58) Field of Classification Search
CPC .......... G06F 21/44; G06G 7/12; H04L 9/3278
See application file for complete search history.

(56) References Cited

U.S. PATENT DOCUMENTS

2013/0069626 A1   3/2013   Zhou et al.
2013/0073598 A1   3/2013   Jacobson et al.
(Continued)

OTHER PUBLICATIONS

International Search Report for PCT/IB2019/052169 dated Jul. 2, 2019.
Written Opinion for PCT/IB2019/052169 dated Jul. 2, 2019.

*Primary Examiner* — Rodman Alexander Mahmoudi
(74) *Attorney, Agent, or Firm* — Pearne & Gordon LLP

(57) ABSTRACT

A MLU-based magnetic device including a plurality of MLU-based magnetic cells, each MLU cell including a first ferromagnetic layer having a first magnetization, a second ferromagnetic layer having a second magnetization, and a spacing layer between the first and second ferromagnetic layers. An input device is configured for generating an input signal adapted for changing the orientation of the first magnetization relative to the second magnetization and vary a resistance of the MLU device. A bit line is configured for passing a sense signal adapted for measuring the resistance. A processing unit is configured for computing an electrical variation from the sense signal and outputting an electrical variation signature. The present disclosure further pertains to an authentication method for reading the MLU device.

12 Claims, 6 Drawing Sheets

(51) Int. Cl.
    *G06F 21/44*     (2013.01)
    *G06G 7/12*      (2006.01)
    *H04L 9/32*      (2006.01)

(56) References Cited

U.S. PATENT DOCUMENTS

| | | |
|---|---|---|
| 2015/0071431 A1 | 3/2015 | Zhu et al. |
| 2015/0071432 A1* | 3/2015 | Zhu .................. G09C 1/00 |
| | | 365/158 |
| 2015/0077097 A1 | 3/2015 | Cambou et al. |
| 2015/0188718 A1 | 7/2015 | Falk |
| 2015/0262662 A1 | 9/2015 | Andre |
| 2016/0018482 A1* | 1/2016 | Yehoshua .......... G11C 11/1659 |
| | | 324/252 |
| 2016/0148666 A1 | 5/2016 | Rosenberg et al. |
| 2017/0053708 A1 | 2/2017 | Wong et al. |
| 2017/0170827 A1* | 6/2017 | Annunziata ......... H03K 19/003 |
| 2017/0243625 A1 | 8/2017 | Stainer |
| 2017/0322263 A1* | 11/2017 | Bandiera ............ G01R 33/0017 |
| 2017/0371008 A1* | 12/2017 | Bandiera ............ G11C 11/1673 |

\* cited by examiner

MLU-BASED MAGNETIC DEVICE HAVING AN AUTHENTICATION AND PHYSICAL UNCLONABLE FUNCTION AND AUTHENTICATION METHOD USING SAID MLU DEVICE

FIELD

The present invention concerns a magnetic logic unit (MLU)-based magnetic device configured for performing an authentication function and for generating physical unclonable functions. The present invention further concerns an authentication method using the MLU-based magnetic device.

DESCRIPTION OF RELATED ART

Development of Physical Unclonable Functions (PUFs) is currently a hot topic in the field of security.

PUFs can extract chip-unique signatures from integrated circuits (ICs) by exploiting uncontrollable randomness due to manufacturing process variations. These signatures can then be used for many hardware security applications including authentication, anti-counterfeiting, IC metering, signature generation, and obfuscation. These PUF rely on physical properties to allows unambiguous, intrinsic and unforgeable identification of a device.

PUFs are based on a challenge/response principle, where the authentication is performed by providing an input signal (the challenge) to the PUFs, and comparing its output (the response) to a reference corresponding to the identity to match.

One of the main property of PUFs is that the device is one-way, which implies that the response cannot be retraced unambiguously to its challenge, but a single challenge always results in an identical response.

A typical example of authentication is for software licensing, where a license is activated for only a single device, where a PUF would completely prevent hacking and impersonation.

However, as of now, very few devices corresponds strictly to all the criterion for a PUF. The only referenced example of a true PUF functionality involves optics, with a laser (challenge) being passed through a transparent medium where imperfections induces a unique scattering pattern (response). But this solution is cumbersome and difficult to miniaturize.

US2015071432 discloses to PUFs-based on an array of magnetoresistive random-access memory (MRAM) cells. A challenge to the array of MRAM cells may identify some of the cells to be used for the physically unclonable function. A response to the challenge may be obtained for each cell by using the resistance(s) of one or both of the MTJs for a cell to obtain a value that serves as the response for that cell.

US2015071431 describes a method of implementing a PUF. The method includes exposing an array of MRAM cells to an orthogonal external magnetic field. The MRAM cells are each configured to represent one of a first logical state and a second logical state, and the orthogonal external magnetic field is oriented in an orthogonal direction to an easy axis of a free layer of the MRAM cells to place the MRAM cells in a neutral logical state that is not the first logical state or the second logical state. The method further includes removing the orthogonal external magnetic field to place each of the MRAM cells of the array randomly in either the first logical state or the second logical state.

US2017170827 discloses magnetic tunnel junction (MTJ) structures and permanent bit strings used for chip identification and/or authentication. The MTJ element structures can have a defined resistance profile such that the intrinsic variability of the MTJ element structure is used to encode and generate a bit string that becomes a fingerprint for the chip.

US2013073598 concerns an entropy source and a random number (RN) generator. In one aspect, a low-energy entropy source includes a magneto-resistive (MR) element and a sensing circuit. The MR element is applied a static current and has a variable resistance determined based on magnetization of the MR element. The sensing circuit senses the resistance of the MR element and provides random values based on the sensed resistance of the MR element.

SUMMARY

The present disclosure concerns a MLU-based magnetic device comprising one or a plurality of MLU-based magnetic cells, each MLU cell comprising a first ferromagnetic layer having a first magnetization, a second ferromagnetic layer having a second magnetization, and a spacing layer between the first and second ferromagnetic layers; an input device configured for generating an input signal (challenge) adapted for changing the orientation of the first magnetization relative to the second magnetization and vary a resistance of the MLU device; a bit line configured for passing a sense signal adapted for measuring said resistance; and a processing unit configured for computing an electrical variation from the sense signal and outputting an electrical variation signature.

In an embodiment, the processing unit can comprise a comparison circuit configured for comparing the electrical variation signature to a reference electrical variation signature computed for a reference MLU device and outputting an output signal comprising information on the match or non-match between the electrical variation signature and the reference electrical variation signature.

The present disclosure further concerns an authentication method using the MLU device, comprising:

providing an input signal in order to change the orientation of the first magnetization relative to the second magnetization and vary a resistance of the MLU device;

providing a sense signal in the bit line for measuring said resistance; and computing an electrical variation from the sense signal and outputting an electrical variation response (or signature).

In an embodiment, the input signal comprises a read magnetic field provided by a field device. The field device can comprise a field line adapted for passing a read current that generates the read magnetic field.

In another embodiment, the electrical variation comprises a noise spectral density.

Due to process variability, each MLU cell has individual characteristics related to the magnetic portions of the MLU cell layers, such as transition fields, domain wall movement or unpinning of magnetization, or any other magnetic behavior inside the magnetic portions that induces electrical variations. Furthermore, each MLU cell has individual electrical variation characteristics. These characteristics can be combined in the electrical variation signature of the MLU device.

Due to the randomness of process induced variabilities and to the one or plurality of MLU cells comprised in the MLU device, the electrical variation signature of an MLU device is both unique and unreproducible, like a fingerprint, ensuring the impossibility of manufacturing a counterfeit.

The MLU device can thus be configured for performing an authentication function and for generating physical unclonable functions. Challenging the MLU device can be done by measuring the electrical variation of the MLU device at a single or several set frequencies or a bandwidth, for a plurality of magnetic fields applied on the MLU cells.

The plurality of magnetic fields can be applied by means of a plurality of currents passed through metallic lines addressing the MLU cells or by other field device capable of generating suitable said plurality of magnetic fields.

Such electrical variation response may then be compared, by using characteristics features like peaks and valleys of the computed electrical variation, to a reference electrical variation corresponding to the device to authenticate.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS

Figure 1:
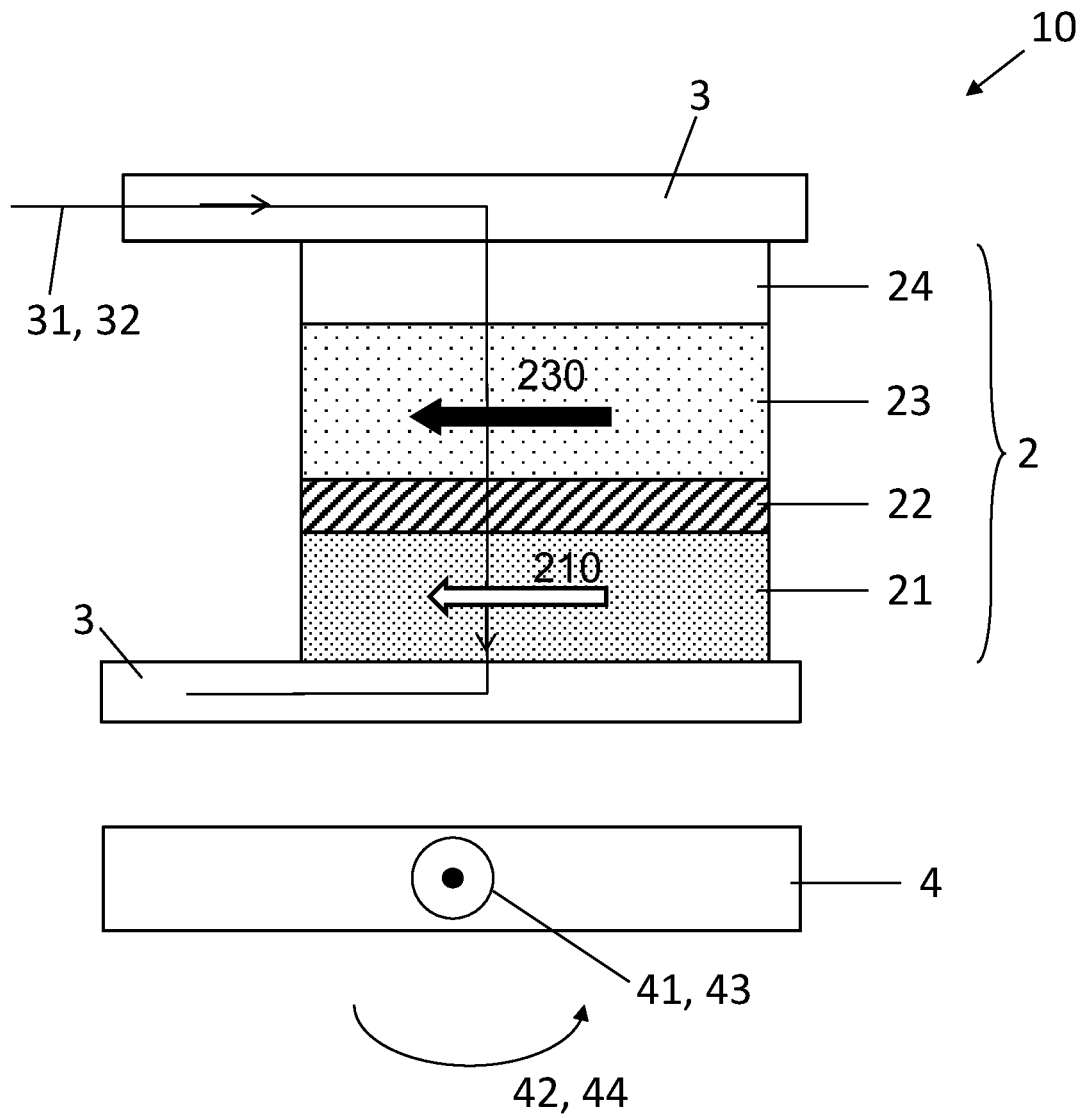
FIG. 1 illustrates a MLU-based magnetic cell, according to an embodiment.

FIG. 1 illustrates a MLU-based magnetic cell 10, according to an embodiment. The MLU cell 10 includes a first ferromagnetic layer 21, a second ferromagnetic layer 23, and a spacer layer 22 that is disposed between the first ferromagnetic layer 21 and the second ferromagnetic layer 23.

Each of the first and second ferromagnetic layers 21, 23 can include, or be formed of, a magnetic material and, in particular, a magnetic material of the ferromagnetic type. The first ferromagnetic layer 21, or sense layer, can include a soft ferromagnetic material, namely one having a relatively low coercivity, while the second ferromagnetic layer 23 can include a hard ferromagnetic material, namely one having a relatively high coercivity. In such manner, a first magnetization, or sense magnetization, 210 of the first ferromagnetic layer can be used as a sense layer, i.e., can be readily varied under low-intensity magnetic fields at which a second magnetization, or reference, 230 of the second ferromagnetic, or reference, layer 23 remains fixed and is used as a reference layer. Suitable ferromagnetic materials include transition metals, rare earth elements, and their alloys, either with or without main group elements. For example, suitable ferromagnetic materials include iron ("Fe"), cobalt ("Co"), nickel ("Ni"), and their alloys, such as permalloy (or Ni80Fe20); alloys based on Ni, Fe, and boron ("B"); Co90Fe10; and alloys based on Co, Fe, and B. In some instances, alloys based on Ni and Fe (and optionally B) can have a smaller coercivity than alloys based on Co and Fe (and optionally B).

Other implementations of the sense layer 21 and the reference layer 23 are contemplated. For example, either, or both, of the sense layer 21 and the reference layer 23 can include multiple sub-layers in a fashion similar to that of the so-called synthetic antiferromagnetic layer.

Other implementations of the MLU cell 10 are contemplated. For example, the relative positioning of the first ferromagnetic layer 21 and the second ferromagnetic layer 23 can be reversed, with the sense layer 21 disposed above the second ferromagnetic layer 23.

The spacer layer 22 can be a non-magnetic conductive layer, such as in a giant magnetoresistance junction or an insulator, such as in a tunnel magnetoresistance junction.

In the latter case, the tunnel barrier layer 22 can include, or be formed of, an insulating material. Suitable insulating materials include oxides, such as aluminum oxide (e.g., $Al_2O_3$) and magnesium oxide (e.g., MgO). A thickness of the tunnel barrier layer 22 can be in the nm range, such as from about 1 nm to about 10 nm.

The MLU cell 10 further comprise a bit line 3 electrically contacting one end of the MLU cell 10 and the other end of the MLU cell 1 such that a sense current, or sense signal, 31 can be passed in the MLU cell 10. The MLU cell 10 further includes an input signal 44 (challenge) configured for changing the orientation of the sense magnetization 210 relative to the reference magnetization 230 and vary a resistance of the MLU device.

In an embodiment, the input signal can comprise a read magnetic field 44 provided by a field device. In the particular embodiment illustrated in FIGS. 1 and 2, the field device includes a field line 4 arranged for passing a read current 43 generating the read magnetic field 44.

A MLU-based magnetic device 100 can comprise a plurality of MLU cells 10 electrically connected in any series or parallel arrangement.

Figure 2:
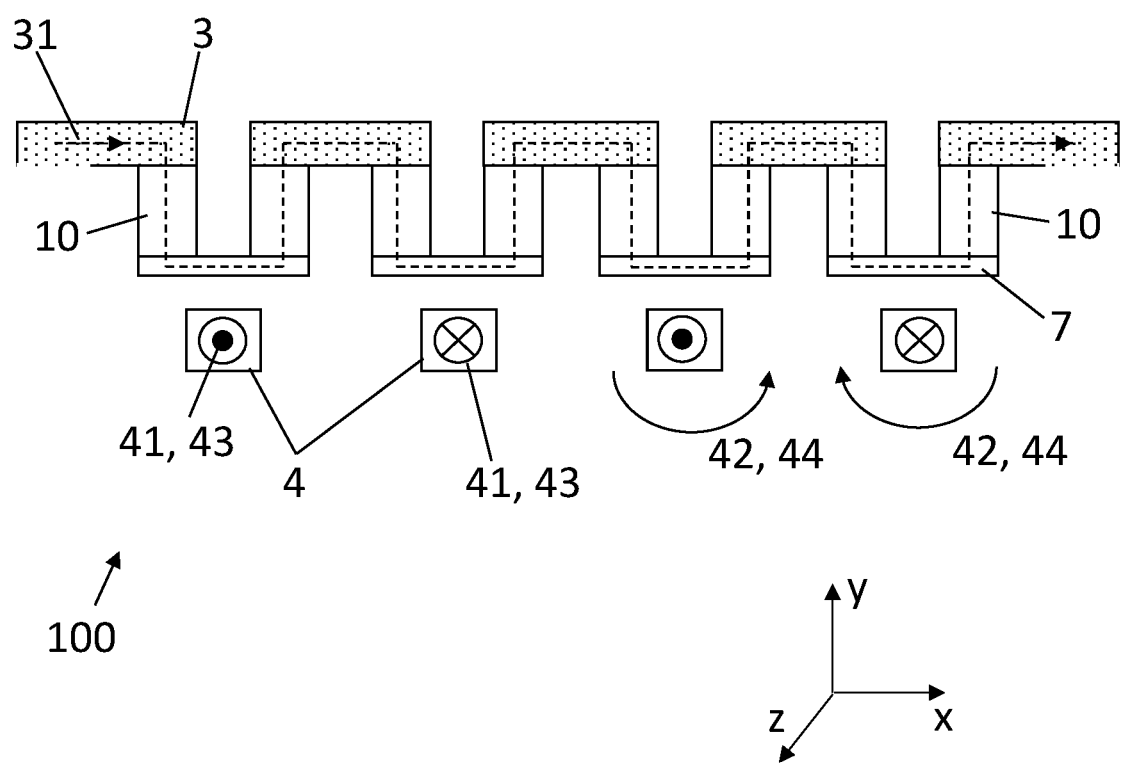
FIG. 2 shows a cross section view of an MLU device comprising a plurality of MLU cells, according to an embodiment.

FIG. 2 shows a cross section view of an exemplary MLU device 100 comprising a row containing a plurality of MLU cells 10, each MLU cells 10 being connected in series via the bit line 3. The MLU device 100 can comprise a plurality of rows arranged in the plane x-z (extending perpendicular to the page) such as to form an array of row and columns. The field line 4 addresses each MLU cells 10. The field line 4 can be continuous, for example by having the shape of a serpentine running through the array, in the plane x-z, or the field line 4 can comprise a plurality of field line portions, extending perpendicular to the row of MLU cells 10.

The MLU device 100 can be written (or programmed) by providing a data state to each of the MLU cells 10. This can be performed by passing a write current 41 in the field line 4. The write current 41 can be configured such as to generate a write magnetic field 42 adapted for switching the direction of the reference magnetization 230 in each of the MLU cells 10.

The specific combination of the written direction of the reference magnetization 230 in each of the MLU cells 10 corresponds to a programmed state of the MLU device 100.

Depending on the field line 4 configuration, the write magnetic field 42 switches the reference magnetization 230 of all the MLU cells 10 in the same direction or in different directions. This can be achieved, for example, when a single field line 4 is used such that a single write magnetic field 42 is generated in one direction. Alternatively, and as shown in FIG. 2, the field line 4 can be configured to generate a plurality of write magnetic fields 42 such that the reference magnetization 230 of a MLU cell 10 is aligned in a direction opposed to the one of the reference magnetization 230 of the adjacent MLU cell 10.

In a variant, the MLU cell 10 comprises an antiferromagnetic layer 24 disposed adjacent to the second ferromagnetic layer 23 and, through exchange bias, pins the reference magnetization 230 along a particular direction when a temperature within, or in the vicinity of, the antiferromagnetic layer 24 is at a low threshold temperature $T_L$, i.e., below a blocking temperature, such as a Neel temperature, or another threshold temperature of the antiferromagnetic layer 24. The antiferromagnetic layer 24 unpins, or frees, the reference magnetization 230 when the temperature is at the high threshold temperature $T_H$, i.e., above the blocking temperature, thereby allowing the reference magnetization 230 to be switched to another direction. In this configuration, writing the MLU device 100 can comprise a step of heating the MRAM cells 10 at the high threshold temperature $T_H$ such as to unpin the reference magnetization 230 when the programming magnetic field 42 is generated. This can be performed by passing a heating current 32 in the bit line 3. Once the reference magnetization 230 has been switching in the written direction, the MRAM cells 10 can be cooled down to the low threshold temperature $T_L$, for example by stopping the heating current 32 from passing in the bit line 3, such as to pin the reference magnetization 230 in the written direction.

Alternatively, the step of heating the MRAM cells 10 at the high threshold temperature $T_H$ can be achieved by passing the heating current 32 in the field line 4. In this alternative, it is assumed that the heat generated by Joule effect through the field line 4 when passing the heating current 32 is transmitted to the MLU cells 10 by thermal conduction through an electrically non-conductive, dielectric/oxide layer (not shown) between the field line 4 and the MLU cells 10.

Other configurations of the field line 4 can be envisaged such as to switch the reference magnetization 230 of the MLU cells 10 according to any other patterns.

Other arrangements of the MLU device 100 can also be contemplated, for example wherein the plurality of MLU cells 10 are electrically connected in parallel.

Figure 3:
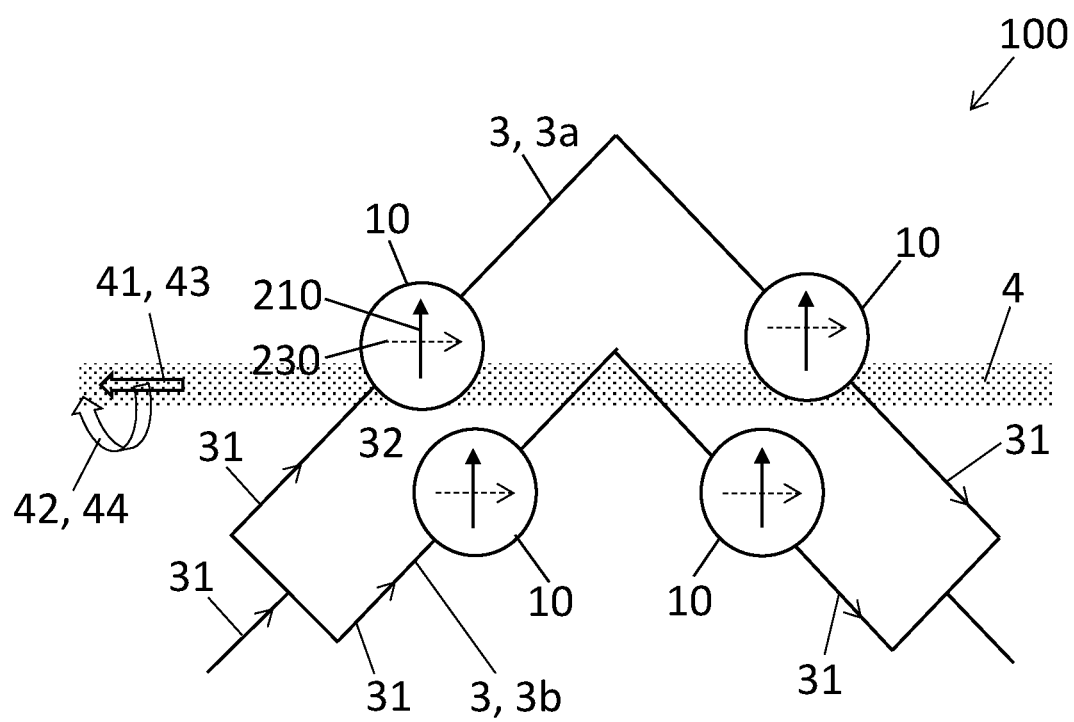
FIG. 3 shows a top view of an MLU device comprising a plurality of MLU cells, according to another embodiment.

FIG. 3 shows a top view of another exemplary MLU device 100 wherein the MRAM cells 10 are arranged according to a Wheatstone bridge, or full bridge, circuit configuration. In particular, the MLU device 100 comprises a bit line 3, forming a first branch 3a and connecting in series at least two MLU cells 10. The MLU device 100 further comprises another bit line 3, forming a second branch 3b and connecting in series at least two MLU cells 10, the two branches 3a, 3b being electrically connected in parallel. The field line 4 can address the MLU cells 10 by being configured for passing the write current 41 and the input signal 43. More generally, the plurality of MRAM cells 10 can be arranged such as to form a half-bridge or full-bridge circuit configuration. The plurality of MRAM cells 10 can also be arranged in single branch.

According to an embodiment, an authentication method using the MLU device 100 can comprise the step of providing the input signal 43 in order to change the orientation of the sense magnetization 210 relative to the reference magnetization 230 and vary a resistance of the MLU device 100.

The step of varying the orientation of the sense magnetization 210 can comprise passing the input signal 43 in the field line 4 in order to generate a read magnetic field 44 addressing the plurality of MLU cells 10.

The magnitude of the input signal 43 can be varied such as to vary the intensity of the read magnetic field 44 applied on the MLU cells 10. The varying read magnetic field 44 changes the orientation of the sense magnetization 210 in the plurality of MLU cells 10 but not that of the reference magnetization 230. The input signal 43 thus modulates the resistance of each of the MLU cells 10.

The magnitude of the input signal 43 can be varied such that the read magnetic field 44 is slowly stepped, for example in 1-2 Oe increments. At each increments step, the MLU device 100 may be allowed to equilibrate (for example for 2 minutes).

The authentication method further comprise a step of providing the sense signal 31 in the bit line 3 for measuring a total resistance R of the MLU device 100.

The authentication method further comprise a step of computing an electrical variation from the sense signal 31 and outputting an electrical variation response (or signature). The electrical variation response obtained from the sense signal 31 comprises a signature characteristic of the sense magnetization 210 switching properties for each of the MLU cells 10.

Depending on the field line 4 configuration, the read magnetic field 44 addressing the plurality of MLU cells 10 can differ between the MLU cells 10. For example, the field line 4 can be arranged such that the read current 43 passes in a first direction the field line 4 addressing a subset of a plurality of MLU cells 10 and in a second direction, opposed to the first direction, in the field line 4 addressing the other MLU cells 10. The read magnetic field 44 will thus be applied on the subset of MLU cells 10 in a direction opposed to the one applied on the other MLU cells 10. Such a field line 4 configuration is illustrated in FIG. 2.

Other possible field line 4 arrangements can include a field line 4 configured for generating a read magnetic field 44 applied to the MLU cells 10 with a single direction, or a plurality of read magnetic fields 44, each having a different direction and being applied to a different subset of MLU cells 10.

The different field line 4 arrangements above will result in a different total resistance R of the MLU device 100 and thus, in a different electrical variation response.

It should be understood that the present invention is not limited to the exemplary embodiments described above and other examples of implementations are also possible within the scope of the patent claims.

For example, the field device can be configured to generate the write magnetic field 42 and/or the read magnetic field 44 (or input signal) without the MLU device 100 requiring the field line 4. In a possible embodiment, the field device generate magnetic field by means of an electromagnet. In another possible embodiment, the field device generate magnetic field by means of permanent magnets. In this configuration, the field device can be configured for generating the write magnetic field 42 such that the direction of the reference magnetization 230 in each of the MLU cells 10 can be switched. The field device can be further configured for providing the read magnetic field 44 addressing the plurality of MLU cells 10.

In yet another embodiment, the input signal can include a supply voltage or current, a temperature variation or any other input signal that is adapted for switching the sense magnetization 210.

During the reading step of the MLU device 100, the field device can be configured such as to provide a varying read magnetic field 44 that changes the orientation of the sense magnetization 210 in the plurality of MLU cells 10 but not that of the reference magnetization 230. The field device can be further configured such that the read magnetic field 44 can be slowly stepped, for example in such a way as already described above.

In another possible embodiment, when writing the MLU device 100, the direction of the reference magnetization 230 in each of the MLU cells 10 can be switched by using an annealing treatment. For example, the reference magnetization 230 aligns parallel to the anisotropy axis of the reference layer during annealing.

The total resistance R of the MLU device 100 can be measured in a single operation. Such sensing operation is described in more details in patent application US2013241536 by the present applicant. The sense signal 31, or a voltage corresponding to the sense signal 31, corresponds to a signal that comprises a signature characteristic of the sense magnetization 210 switching properties for each of the MLU cells 10.

Due to process variability during the manufacturing of the MLU device 100, each MLU cell 10 can have characteristics related to the magnetic portions of the MLU cell layers, such as transition fields, domain wall movement or unpinning of magnetization, or any other magnetic behavior inside the magnetic portions that induces electrical variation that is distinct from the one another MLU cell 10. Here, the transition field is the magnitude of a magnetic field that is required to switch, or change the direction of, the magnetization of the sense layer or reference layer. In other words, the sense or reference magnetization 210, 230 of the different MLU cells 10 can switch at different magnitudes of the read magnetic field 44. Each MLU cell 10 can further have individual electrical variation characteristics.

Figure 5:
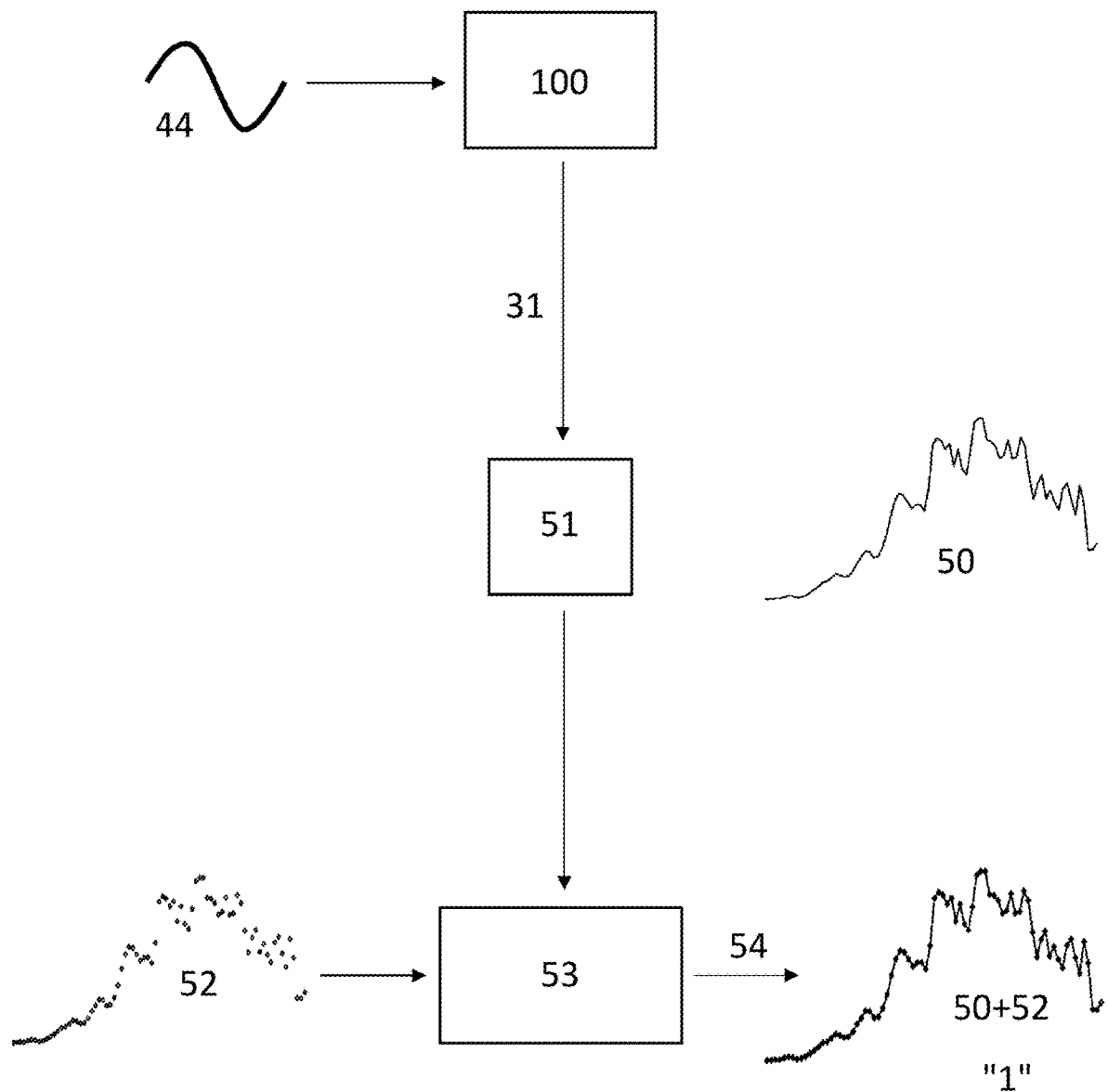
FIGS. 5 and 6 illustrate schematically an authentication method using the MLU device, for a matching noise spectral density (FIG. 5) and a non-matching noise spectral density (FIG. 6).
Figure 6:
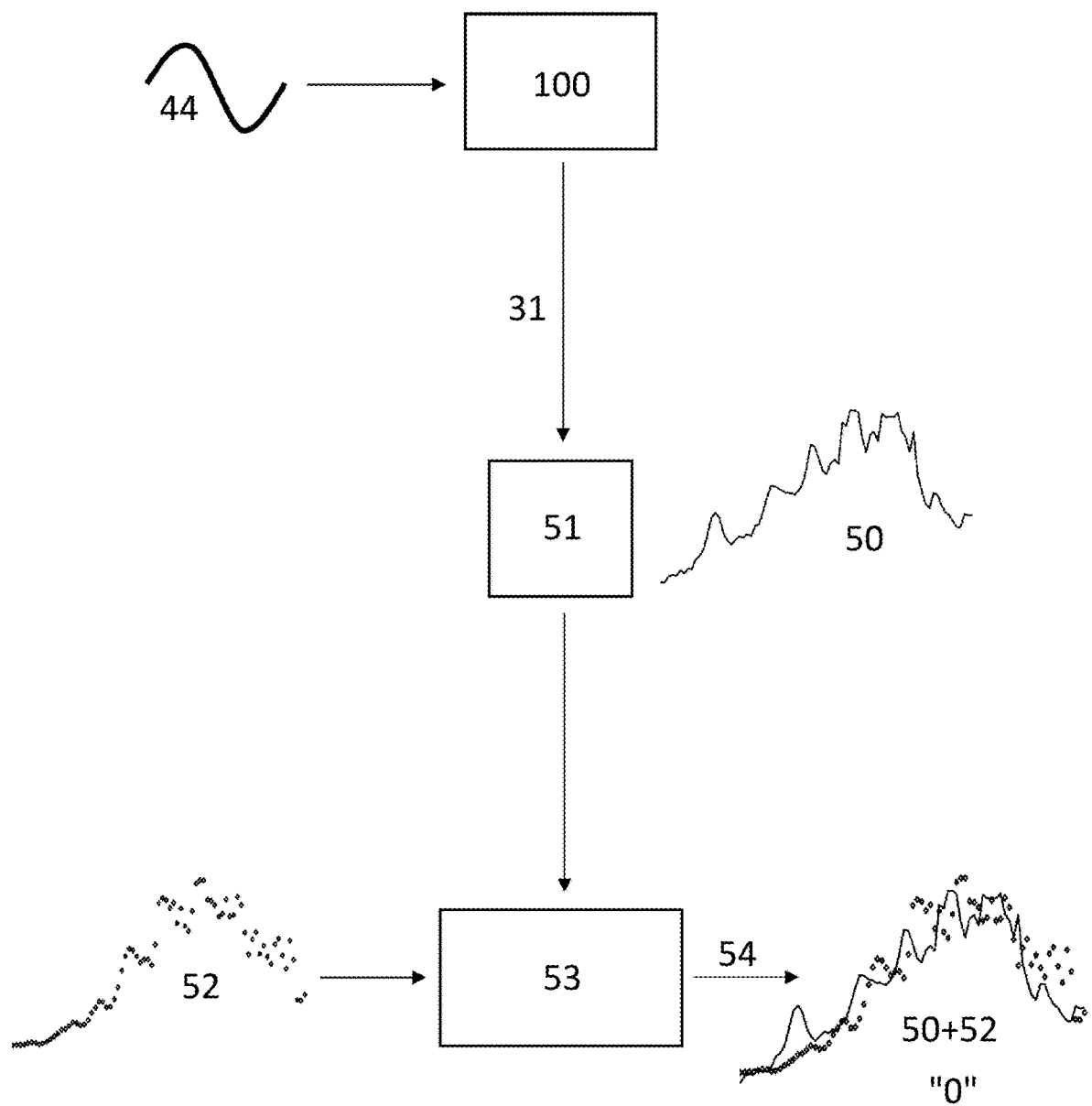

The MLU device 100 can comprise a processing unit 51 configured for computing a electrical variation from the sense signal 31 (see FIGS. 5 and 6).

The authentication method using the MLU device 100 can further comprise a step of using the processing unit 51 for computing the electrical variation from the sense signal 31. The computed electrical variation corresponds to an electrical variation signature 50 since it is characteristic of the MLU device 100 from which it has been obtained. Indeed, a unique electrical variation signature 50 is computed for a MLU device 100 that translates the process variability during the manufacturing of the MLU device 100, due to the distinct characteristics related to the magnetic portions of the MLU cell layers from a MLU cell to another MLU cell 10.

The electrical variation can comprise a variation directly measured in volt V by a voltmeter. Alternatively, the electrical variation can comprise a variation expressed in $V^2/Hz$, or $V/sqrt(Hz)$ or $VN/sqrt(Hz)$ that can be measured by using a spectral analyser. For example, the electrical variation can comprise a noise spectral density.

In an embodiment, the processing unit 51 comprises a spectrum analyzer destined to compute the noise spectral density signature 50. The spectrum analyzer 51 calculates the magnitude of the sense signal 31 versus frequency within the full frequency range of the spectrum analyzer. In fact, any suitable device for measuring a voltage variation at a given frequency can be included in the processing unit 51 to compute the noise spectral density signature 50.

The noise spectral density signature 50 can be computed at a single frequency for all or part of the magnitudes of the varying read magnetic field 44.

Alternatively, the noise spectral density signature 50 can be computed at any frequencies for all or part of the magnitudes of the varying read magnetic field 44. For example, the noise spectral density signature 50 can be computed at frequencies between 0.1 Hz and 10 kHz.

In another variant, the noise spectral density signature 50 can be computed across a bandwidth for all or part of the magnitudes of the varying input signal 43 (thus varying read magnetic field 44).

Figure 4:
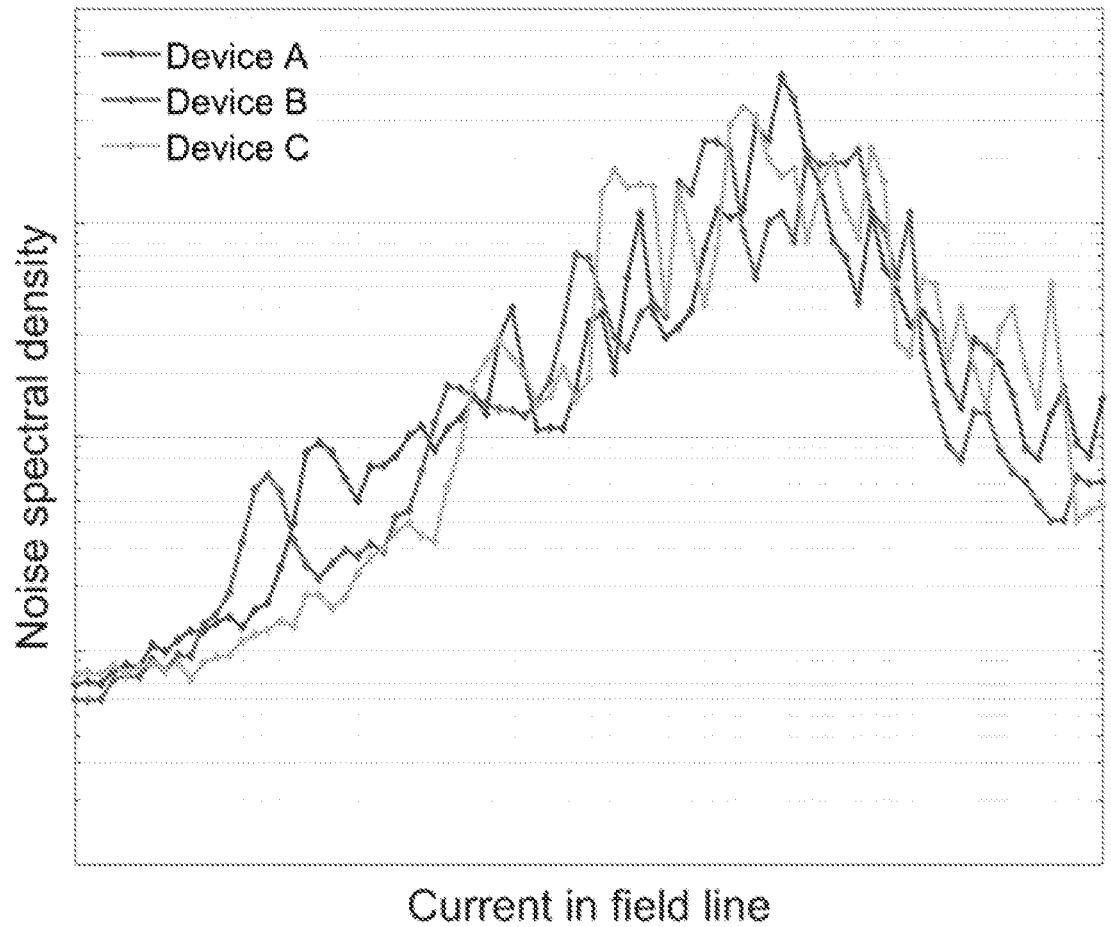
FIG. 4 compares the measured noise spectral density as a function of a read magnetic field, for three different MLU devices.

FIG. 4 reports the noise spectral density signature 50 as a function of the read magnetic field 44 for three different MLU devices 100 having the same configuration. Due to process variability during the manufacturing of the MLU devices 100, three distinct noise spectral density signatures are measured for the three MLU devices 100.

According to an embodiment, the processing unit further comprises a comparison circuit 53 and the authentication method further comprises a step of using the comparison circuit 53 to compare the computed noise spectral density signature 50 of the MLU device 100 under investigation to a reference noise spectral density signature 52. It can be understood that the reference noise spectral density signature 52 can be a noise spectral density that has been computed from the sense signal 31 of a reference MLU device 100.

Comparing the computed noise spectral density signature 50 to the reference noise spectral density signature 52 can be performed by using characteristics features of the noise spectral density signature such as peaks, valleys, saddle points or steps. Comparing the computed noise spectral density signature 50 to the reference noise spectral density signature 52 can further be performed by using the spectrum shape. For instance, the noise could have a $1/f$ or a $1/f^2$ dependence in given conditions.

FIGS. 5 and 6 illustrate schematically an exemplary MLU device 100 and the authentication method, according to an embodiment. The read magnetic field 44 is provided to the MLU device 100 such as to orient the sense magnetizations of the MLU cells 10 and vary the total resistance R of the MLU device 100. The sense signal 31 is provided in the bit line 3 such that the total resistance R of the MLU device 100 can be measured. The processing unit 51 is used for computing a noise spectral density from the sense signal 31 and outputting the noise spectral density signature 50. The comparison circuit 53 is then used to compare the outputted noise spectral density signature 50 to the reference noise spectral density signature 52.

In FIG. 5, the noise spectral density signature 50 matches the reference noise spectral density signature 52. This can be seen from the superposition 50+52 of the reference noise spectral density signature 52 and the noise spectral density signature 50. In FIG. 6, the noise spectral density signature 50 does not match the reference noise spectral density signature 52.

The comparison circuit 53 can be further configured for outputting an output signal 54 comprising information on the match or non-match between the noise spectral density signature 50 and the reference noise spectral density signature 52. For example, in the case the noise spectral density signature 50 matches the reference noise spectral density signature 52, the output signal 54 can correspond to a logical "1" data value. If the noise spectral density signature 50 does not match the reference noise spectral density signature 52, the output signal 54 can correspond to a logical "0" data value.

In an embodiment, the noise spectral density signature 50 measured for the MLU device 100 may be configured for generating physical unclonable functions (PUFs). For example, a MLU device 100 may be identified using PUFs. A PUF implements challenge-response authentication, where one party presents a question ("challenge") and another party must provide a proper answer ("authentication response") to be authenticated.

Here, the read magnetic field 44 provided to the MLU device 100 under investigation (challenged MLU device 100) corresponds to the challenge. The comparison circuit 53, comparing the noise spectral density signature 50 of the challenged MLU device 100 to the reference noise spectral density signature 52 of the reference MLU device 100, may be configured to generate a PUF output bit (output signal) 54, corresponding to the authentication response.

The PUF output bit 54 may thus be used as a product identifier to uniquely identify a challenged MLU device 100 based on manufacturing process variations that results in a particular (unique) noise spectral density signature, when the challenged MLU device 100 is compared to a reference MLU device 100, when the challenged MLU device 100 and the reference MLU device 100 are written with the same programmed state.

In an embodiment, there is provided a computer program product embodied in a non-transitory computer readable medium and comprising computer code for causing the processing unit 51 to execute the authentication method items.

REFERENCE NUMBERS AND SYMBOLS

10 MLU-based magnetic cell
100 MLU-based magnetic device
21 first magnetic layer, sense layer
210 first magnetization, sense magnetization
22 spacer layer
23 second magnetic layer, storage layer
230 second magnetization, storage magnetization
24 antiferromagnetic layer
3 bit line
3a first branch
3b second branch
31 sense current, sense signal
32 heating current
4 field line, input device
41 write current
42 write magnetic field
43 read current
44 read magnetic field, input signal
50 noise spectral density signature
51 noise measurement, spectrum analyzer
52 reference noise spectral density signature
53 comparison circuit
54 output signal, PUF output bit
R resistance of the ML device

What is claimed is:

1. A magnetic logic unit (MLU)-based magnetic device comprising:
one or a plurality of MLU-based magnetic cells, each MLU cell comprising a first ferromagnetic layer having a first magnetization, a second ferromagnetic layer having a second magnetization, and a spacing layer between the first and second ferromagnetic layers;
an input device configured for generating an input signal adapted for changing the orientation of the first magnetization relative to the second magnetization, in the plurality of MLU cells, and vary a resistance of the MLU device;
a bit line configured for passing a sense signal adapted for measuring said resistance; and
a processing unit;
wherein the input signal comprises a read magnetic field having a magnitude that varies by increment steps;
wherein the processing unit is configured for computing an electrical variation from the sense signal and outputting an electrical variation signature;
wherein the outputted electrical variation signature corresponds to the sense of the different MLU cells switching at different magnitudes of the read magnetic field;
wherein the processing unit comprises a comparison circuit configured for comparing the electrical variation signature to a reference electrical variation signature computed for a reference MLU device and outputting an output signal comprising information on the match or non-match between the electrical variation signature and the reference electrical variation signature;
wherein said electrical variation comprises a noise spectral density, and
wherein the processing unit comprises a noise spectrum analyzer configured for computing a noise spectral density signature.

2. The MLU device according to claim 1, comprising a plurality of MLU-based magnetic cells, wherein each of said plurality of MLU cells is electrically connected in series or in parallel via the bit line or in a combination of series and parallel configurations via the bit line.

3. The MLU device according to claim 1,
wherein said MLU device comprises a bit line forming a first branch and connecting in series at least two MLU cells; and further comprises another bit line forming a second branch and connecting in series at least two MLU cells; and
wherein the two branches are electrically connected in parallel.

4. The MLU device according to claim 1, wherein said output signal corresponds to a logical "1" data value in the case of a match and to a logical "0" data value in the case of non-match or wherein said output signal corresponds to a logical "0" data value in the case of a match and to a logical "1" data value in the case of non-match.

5. The MLU device according to claim 1, configured for generating physical unclonable functions (PUFs) wherein the read magnetic field is usable as challenge and the output signal is usable as response.

6. The MLU device according to claim 1, wherein the input device includes a field line adapted for passing a read current generating the read magnetic field.

7. An authentication method using a magnetic logic unit (MLU) device comprising one or a plurality of MLU-based magnetic cells, each MLU cell comprising a first ferromagnetic layer having a first magnetization, a second ferromagnetic layer having a second magnetization, and a spacing layer between the first and second ferromagnetic layers; an input device configured for generating an input signal adapted for changing the orientation of the first magnetization relative to the second magnetization, in the plurality of MLU cells, and vary a resistance of the MLU device; a bit line configured for passing a sense signal adapted for measuring said resistance; and a processing unit; wherein the input signal comprises a read magnetic field having a magnitude that varies by increment steps; wherein the processing unit is configured for computing an electrical variation from the sense signal and outputting an electrical variation signature; wherein the outputted electrical variation signature corresponds to the sense of the different MLU cells switching at different magnitudes of the read magnetic field; wherein the outputted electrical variation signature corresponds to the sense of the different MLU cells switching at different magnitudes of the read magnetic field;
wherein the processing unit comprises a comparison circuit configured for comparing the electrical variation signature to a reference electrical variation signature computed for a reference MLU device and outputting an output signal comprising information on the match or non-match between the electrical variation signature and the reference electrical variation signature;
wherein said electrical variation comprises a noise spectral density; and wherein the processing unit comprises a noise spectrum analyzer configured for computing a noise spectral density signature; the method comprising:
providing an input signal for changing the orientation of the first magnetization relative to the second magnetization and vary a resistance of the MLU device, wherein the input signal comprises a read magnetic field;
providing a sense signal in the bit line for measuring said resistance;
varying a magnitude by increment steps of the read magnetic field;
computing an electrical variation from the sense signal; and outputting an electrical variation signature, the outputted electrical variation signature corresponding to the sense of the different MLU cells switching at different magnitudes of the read magnetic field.

8. The method according to claim 7, wherein the noise spectral density is computed at a single frequency or at a plurality of frequencies for all or part of the magnitudes of the varying read magnetic field.

9. The method according to claim 8, wherein the noise spectral density is computed at frequencies between 0.1 Hz and 10 kHz.

10. The method according to claim 8, wherein the noise spectral density is computed across a bandwidth for all or part of the magnitudes of the varying read magnetic field.

11. The method according to claim 7,
wherein the processing unit further comprises a comparison circuit; and
wherein the method comprises using the comparison circuit to compare the electrical variation signature to a reference noise electrical variation signature, and outputting an output signal comprising information on the match or non-match between the electrical variation signature and the reference electrical variation signature.

12. A computer program product embodied in a non-transitory computer readable medium and comprising computer code for causing a processing unit of a magnetic logic unit (MLU) device to execute a method, the MLU device comprising one or a plurality of MLU-based magnetic cells, each MLU cell comprising a first ferromagnetic layer having a first magnetization, a second ferromagnetic layer having a second magnetization, and a spacing layer between the first and second ferromagnetic layers; an input device configured for generating an input signal adapted for changing the orientation of the first magnetization relative to the second magnetization, in the plurality of MLU cells, and vary a resistance of the MLU device; a bit line configured for passing a sense signal adapted for measuring said resistance; and the processing unit wherein the input signal comprises a read magnetic field having a magnitude that varies by increment steps; wherein the processing unit is configured for computing an electrical variation from the sense signal and outputting an electrical variation signature; wherein the outputted electrical variation signature corresponds to the sense of the different MLU cells switching at different magnitudes of the read magnetic field;
wherein the outputted electrical variation signature corresponds to the sense of the different MLU cells switching at different magnitudes of the read magnetic field;
wherein the processing unit comprises a comparison circuit configured for comparing the electrical variation signature to a reference electrical variation signature computed for a reference MLU device and outputting an output signal comprising information on the match or non-match between the electrical variation signature and the reference electrical variation signature; wherein said electrical variation comprises a noise spectral density; and wherein the processing unit comprises a noise spectrum analyzer configured for computing a noise spectral density signature; the method comprising:
providing an input signal for changing the orientation of the first magnetization relative to the second magnetization and vary a resistance of the MLU device, wherein the input signal comprises a read magnetic field;
providing a sense signal in the bit line for measuring said resistance;
varying a magnitude by increment steps of the read magnetic field;
computing an electrical variation from the sense signal; and
outputting an electrical variation signature, the outputted electrical variation signature corresponding to the sense of the different MLU cells switching at different magnitudes of the read magnetic field.

* * * * *

UNITED STATES PATENT AND TRADEMARK OFFICE
CERTIFICATE OF CORRECTION

PATENT NO. : 11,921,835 B2
APPLICATION NO. : 16/982099
DATED : March 5, 2024
INVENTOR(S) : Quentin Stainer et al.

It is certified that error appears in the above-identified patent and that said Letters Patent is hereby corrected as shown below:

In the Specification

Column 7, Line 51, delete "VN/sqrt(Hz)" and replace with --V/V/sqrt(Hz)--.

Signed and Sealed this
Twenty-ninth Day of October, 2024

Katherine Kelly Vidal
*Director of the United States Patent and Trademark Office*